United States Patent
Guthrie et al.

(10) Patent No.: US 9,396,127 B2
(45) Date of Patent: Jul. 19, 2016

(54) SYNCHRONIZING ACCESS TO DATA IN SHARED MEMORY

(71) Applicant: INTERNATIONAL BUSINESS MACHINES CORPORATION, Armonk, NY (US)

(72) Inventors: Guy L. Guthrie, Austin, TX (US); Hugh Shen, Austin, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 14/192,227

(22) Filed: Feb. 27, 2014

(65) Prior Publication Data

US 2015/0242320 A1 Aug. 27, 2015

(51) Int. Cl.
*G06F 12/08* (2016.01)

(52) U.S. Cl.
CPC ........ *G06F 12/0891* (2013.01); *G06F 12/0811* (2013.01); *G06F 12/0833* (2013.01); *G06F 2212/283* (2013.01); *G06F 2212/601* (2013.01); *G06F 2212/621* (2013.01)

(58) Field of Classification Search
None
See application file for complete search history.

(56) References Cited

U.S. PATENT DOCUMENTS

| 6,275,907 | B1 | 8/2001 | Baumgartner et al. |
| 6,748,501 | B2 | 6/2004 | Arimilli et al. |
| 6,877,085 | B2 | 4/2005 | Yeh et al. |
| 7,197,604 | B2 | 3/2007 | Guthrie et al. |
| 7,200,717 | B2 | 4/2007 | Guthrie et al. |
| 7,228,385 | B2 | 6/2007 | Guthrie et al. |
| 8,296,519 | B2 | 10/2012 | Guthrie et al. |
| 2006/0085604 | A1* | 4/2006 | Guthrie ................. G06F 9/3004 711/141 |
| 2011/0161590 | A1* | 6/2011 | Guthrie ............... G06F 9/30087 711/122 |

OTHER PUBLICATIONS

Guy L Guthrie,"Synchronizing Access to Data in Shared Memory", U.S. Appl. No. 14/486,635, Filed Sep. 15, 2014, Non-Final Office Action dated Sep. 28, 2015.
Guy L. Guthrie,"Synchronizing Access to Data in Shared Memory", U.S. Appl. No. 14/486,635, Filed Sep. 15, 2014, Notice of Allowance dated Mar. 29, 2016.

* cited by examiner

*Primary Examiner* — Daniel Tsui
(74) *Attorney, Agent, or Firm* — Brian F. Russell; Steven L. Bennett (57) ABSTRACT

In some embodiments, in response to execution of a load-reserve instruction that binds to a load target address held in a store-through upper level cache, a processor core sets a core reservation flag, transmits a load-reserve operation to a store-in lower level cache, and tracks, during a core reservation tracking interval, the reservation requested by the load-reserve operation until the store-in lower level cache signals that the store-in lower level cache has assumed responsibility for tracking the reservation. In response to receipt during the core reservation tracking interval of an invalidation signal indicating presence of a conflicting snooped operation, the processor core cancels the reservation by resetting the core reservation flag and fails a subsequent store-conditional operation. Responsive to not canceling the reservation during the core reservation tracking interval, the processor core determines whether a store-conditional operation succeeds by reference to a pass/fail indication provided by the store-in lower level cache.

7 Claims, 10 Drawing Sheets

SYNCHRONIZING ACCESS TO DATA IN SHARED MEMORY

BACKGROUND OF THE INVENTION

The present invention relates to data processing, and more specifically, to synchronizing access to data in shared memory.

In shared memory multiprocessor (MP) data processing systems, each of the multiple processors in the system may access and modify data stored in the shared memory. In order to synchronize access to a particular granule of memory between multiple processing units and threads of execution, load-reserve and store-conditional instruction pairs are often employed. For example, load-reserve and store-conditional instructions have been implemented in the POWER® instruction set architecture with operation codes (opcodes) associated with the LWARX and STWCX mnemonics and other similar mnemonics specifying different numbers of data bytes), referred to generally hereafter as LARX and STCX. The goal of load-reserve and store-conditional instruction pairs is to load and modify data and then to commit the modified data to coherent memory only if no other thread of execution has modified the data in the interval between the load-reserve and store-conditional instructions. Thus, updates to shared memory can be synchronized without the use of an atomic update primitive that strictly enforces atomicity.

Figure 1:
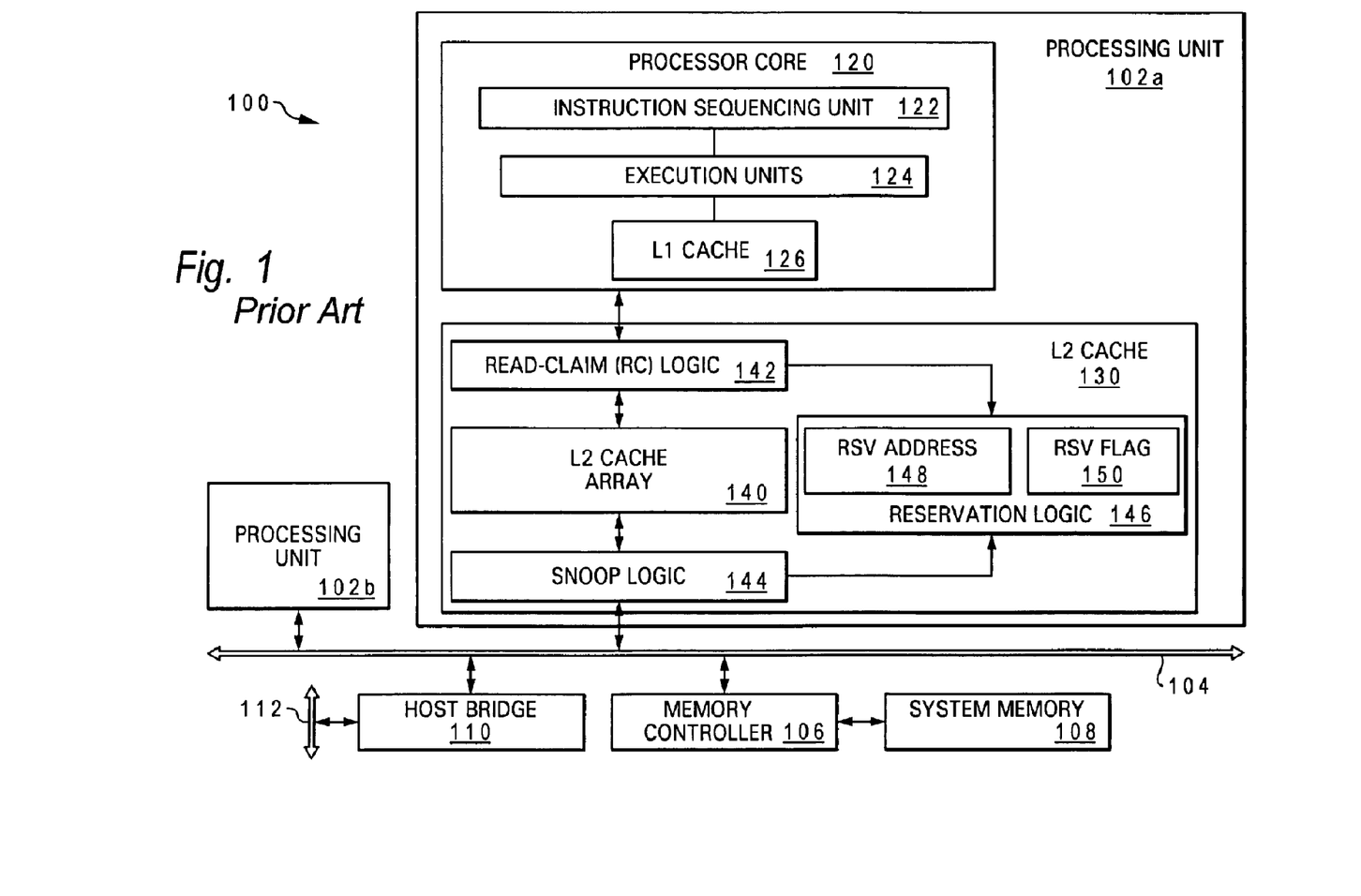
FIG. 1 is a high level block diagram of a conventional data processing system that utilizes load-reserve and store conditional instructions to update shared memory.

With reference now to FIG. 1, a block diagram of a conventional MP computer system supporting the use of load-reserve and store-conditional instructions to synchronize updates to shared memory is illustrated. As shown, computer system 100 includes multiple processing units 102a-102b for processing data and instructions. Processing units 102 are coupled for communication to a system bus 104 for conveying address, data and control information between attached devices. In the depicted embodiment, the attached devices include a memory controller 106 providing an interface to a shared system memory 108 and one or more host bridges 110, each providing an interface to a respective mezzanine bus 112. Mezzanine bus 112 in turn provides slots for the attachment of additional devices, which may include network interface cards, I/O adapters, non-volatile storage device adapters, additional bus bridges, etc.

As further illustrated in FIG. 1, each processing unit 102 includes a processor core 120 containing an instruction sequencing unit 122 for fetching and ordering instructions for execution by one or more execution units 124. The instructions and associated data operands and data results are stored in a multi-level memory hierarchy having at its lowest level system memory 108, and at its upper levels L1 cache 126 and L2 cache 130. The data within the memory hierarchy may generally be accessed and modified by multiple processing units 102a, 102b.

L1 cache 126 is a store-through cache, meaning that the point of cache coherency with respect to other processing units 102 is below the L1 cache (e.g., at L2 cache 130). L1 cache 126 therefore does not maintain true cache coherency states (e.g., Modified, Exclusive, Shared, Invalid) for its cache lines, but only maintains valid/invalid bits. Store operations first complete relative to the associated processor core 120 in the L1 cache and then complete relative to other processing units 102 in L2 cache 130.

As depicted, in addition to the L2 cache array 140, L2 cache 130 includes read-claim (RC) logic 142 for managing memory access requests by the associated processor core 120, snoop logic 144 for managing memory access requests by other processing units 102, and reservation logic 146 for recording reservations of the associated processor core 120. Reservation logic 146 includes at least one reservation register comprising a reservation address field 148 and a reservation flag 150.

Figures 2A, 2B:
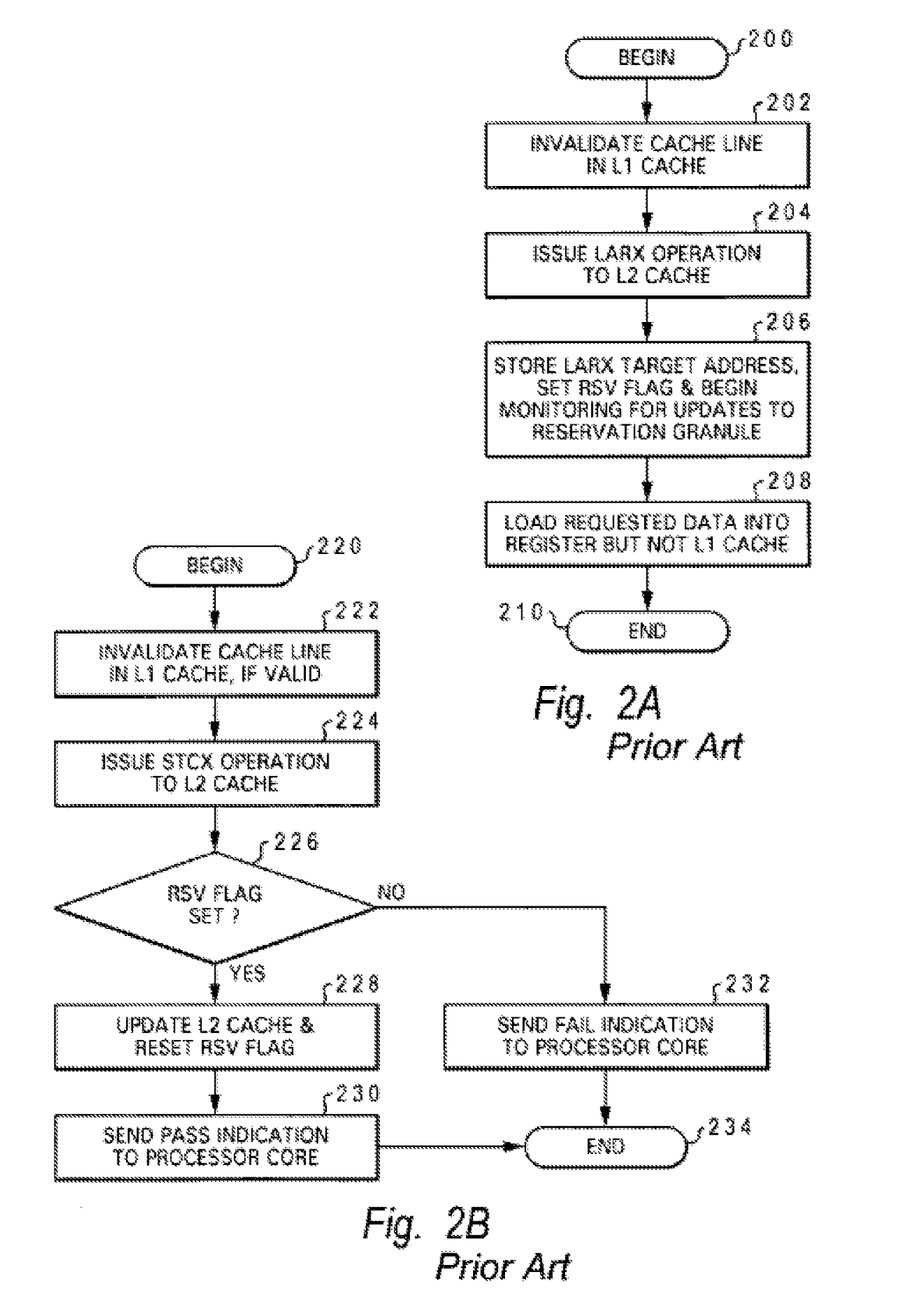
FIG. 2A is a flowchart of a conventional method of processing a load-reserve instruction.
FIG. 2B is a flowchart of a conventional method of processing a store-conditional instruction.

FIG. 2A depicts the manner in which a load-reserve (e.g., LARX) instruction is processed in data processing system 100 of FIG. 1. As shown, the process begins at block 200, which represents the execution of a LARX instruction by execution units 124 of processing unit 102a in order to determine the target address from which data is to be loaded. Following execution of the LARX instruction, L1 cache 126 invalidates the cache line containing the target address at block 202. The cache line is invalidated in L1 cache 126 to prevent the LARX instruction from binding to a potentially stale value in L1 cache 126. The value is potentially stale because another processing unit 102 may have gained ownership of the target cache line in order to modify it.

Following block 202, the process passes to block 204, which illustrates processor core 120 issuing a LARX operation corresponding to the LARX instruction to RC logic 142 within L2 cache 130. As depicted at bock 206, RC logic 142 stores the address of the reservation granule (e.g., cache line) containing the target address in reservation address field 148 and sets reservation flag 150. Reservation logic 146 then begins monitoring for an indication by snoop logic 144 that another processing unit 102 has updated the cache line containing the target address. As illustrated at block 208, RC logic 142 obtains the load data from L2 cache array 140, system memory 108 or another processing unit 102 and then returns the requested load data to processor core 120. In response to receipt of the load data, processor core 120 stores the load data in an internal register, but not in L1 cache 126.

Processor core 120 thereafter attempts to perform an atomic update to the load data through the execution of a store-conditional (e.g., STCX) instruction in accordance with the process depicted in FIG. 2B. As shown, the process begins at block 220, which represents execution units 124 executing the store-conditional instruction to determine the target address of the store-conditional operation. Next, as depicted at block 222, the cache line containing the target address is invalidated in L1 cache 126, if valid. Although the cache line was invalidated earlier at block 202, the invalidation is still performed at block 222 because an intervening load operation to another address in the cache line may have caused the cache line to be loaded back into L1 cache 126.

Following block 222, processor core 120 issues a store-conditional (e.g., STCX) operation corresponding to the store-conditional instruction to RC logic 142 within L2 cache 130, as shown at block 224. RC logic 142 obtains owner permission for the target cache line and then determines at block 226 whether or not reservation flag 150 is still set (i.e., whether or not any other processing unit 102 has modified the reservation granule). If reservation flag 150 is still set, indicating that no other processing unit 102 has modified the reservation granule, RC logic 142 updates L2 cache array 140 with the store data and resets reservation flag 150, as shown at block 228. Reservation logic 146 then sends a pass indication to processor core 120, as shown at block 230. Thereafter, the process ends at block 234.

Returning to block 226, in response to a determination that reservation flag 150 is reset, indicating that another processing unit 102 has modified the reservation granule in the interval between execution of the load-reserve and store-conditional instructions, the store-conditional operation fails in L2 cache 130, and reservation logic 146 transmits a fail indication to processor core 120, as depicted at block 232. Thereafter, processing of the store-conditional operation terminates at block 234.

Figure 2C:
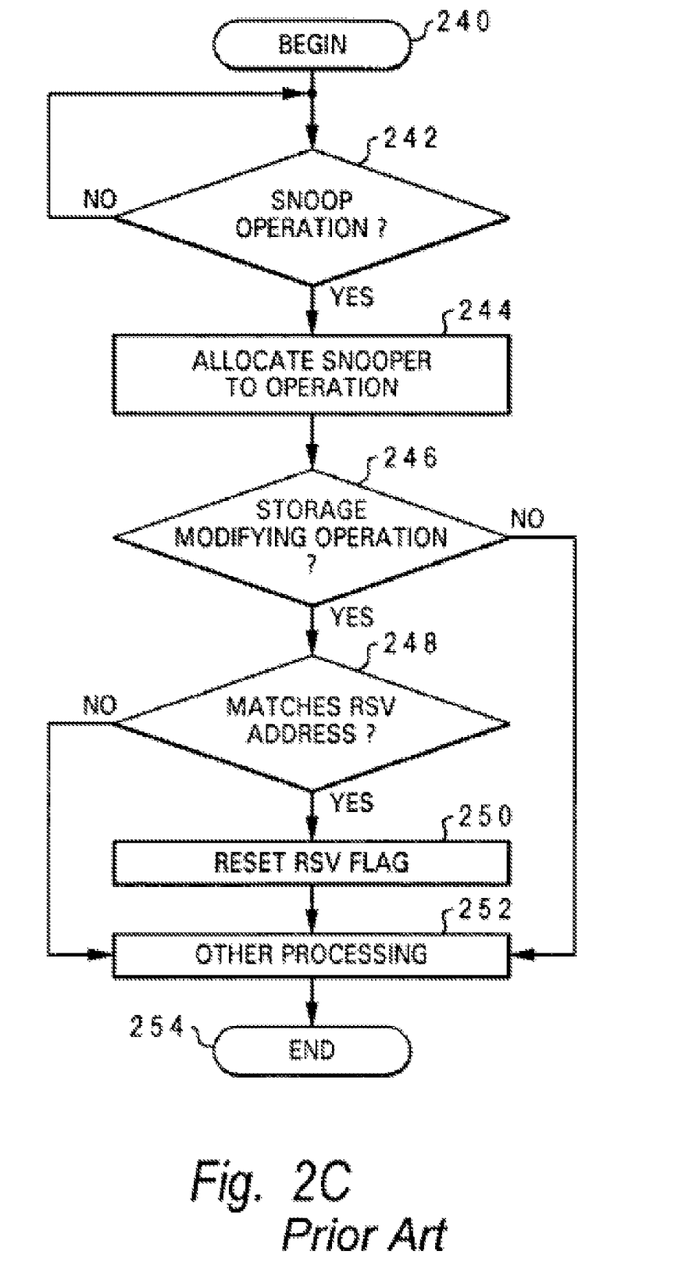
FIG. 2C is a flowchart of a conventional method of processing operations snooped on a system bus.

FIG. 2C illustrates the conventional operation of snoop logic 144 in support of shared memory updates utilizing load-reserve and store-conditional instructions. As depicted, the process begins at block 240 and thereafter proceeds to block 242, which illustrates the process iterating until snoop logic 144 snoops an operation on system bus 104. When snoop logic 144 snoops an operation on system bus 104, snoop logic 144 allocates a snooper to handle the operation at block 244. The snooper determines at block 246 whether or not the snooped operation is a storage-modifying operation. If not, the process passes to block 252 for other processing and thereafter terminates at block 254. If, however, the snooper determines that the snooped operation is a storage-modifying operation, the snooper makes a further determination at block 248 whether the address of the modifying operation matches the contents of reservation address field 148. If so, the snooper resets reservation flag 150 to cause any subsequent store-conditional operation to the address specified in reservation address field 148 to fail (at least until reservation flag 150 is again set), as shown at block 250. Following block 250 or following a determination at block 248 that the address of the snooped modifying operation matches the contents of reservation address field 148, the snooper performs other processing at block 252 (e.g., updating the directory of L2 cache array 140). The process thereafter terminates at block 254.

BRIEF SUMMARY

In some embodiments, in response to execution of a load-reserve instruction that binds to a load target address held in a store-through upper level cache, a processor core sets a core reservation flag, transmits a load-reserve operation to a store-in lower level cache, and tracks, during a core reservation tracking interval, the reservation requested by the load-reserve operation until the store-in lower level cache signals that the store-in lower level cache has assumed responsibility for tracking the reservation. In response to receipt during the core reservation tracking interval of an invalidation signal indicating presence of a conflicting snooped operation, the processor core cancels the reservation by resetting the core reservation flag and fails a subsequent store-conditional operation. Responsive to not canceling the reservation during the core reservation tracking interval, the processor core determines whether a store-conditional operation succeeds by reference to a pass/fail indication provided by the store-in lower level cache.

DETAILED DESCRIPTION

As described above, in conventional shared memory architectures having store-through upper level (L1) caches and store-in lower level (L2) caches, the point of coherency resides at the lower level caches. Consequently, in order to avoid a memory synchronization operation binding with a potentially stale value in an upper level cache in the presence of a conflicting snooped operation that has been received at the lower level cache, the prior art memory synchronization technique discussed above with reference to FIGS. 1 and 2A-2C requires the invalidation of the target cache line of both load-reserve and store-conditional instructions in the L1 cache (see, e.g., block 202 of FIG. 2A and block 222 of FIG. 2B). Such invalidations increase the time required to obtain the data word(s) targeted by load-reserve and store-conditional operations (which must then be obtained from the lower level cache) in cases in which the values in the L1 cache are not stale and can additionally undesirably increase the access latencies of other read accesses to the target cache line.

In accordance with a preferred embodiment, memory synchronization operations are permitted to bind to potentially stale values in an upper level cache and immediately return these values to the processor core. Coherence is nevertheless maintained by the processor core assuming responsibility for tracking the validity of a reservation requested by a load-reserve operation until the lower level cache is able to establish and track the reservation. Responsibility for tracking the validity of the reservation is then transferred to the lower level cache, which thereafter provides the processor core with a pass/fail indication indicating whether a corresponding store-conditional operation completed successfully. This memory synchronization technique not only supports improved access latencies, but also enhances design flexibility in that the core reservation tracking interval during which the processor bears the responsibility for tracking the validity of the reservation can be of variable duration.

Figure 3:
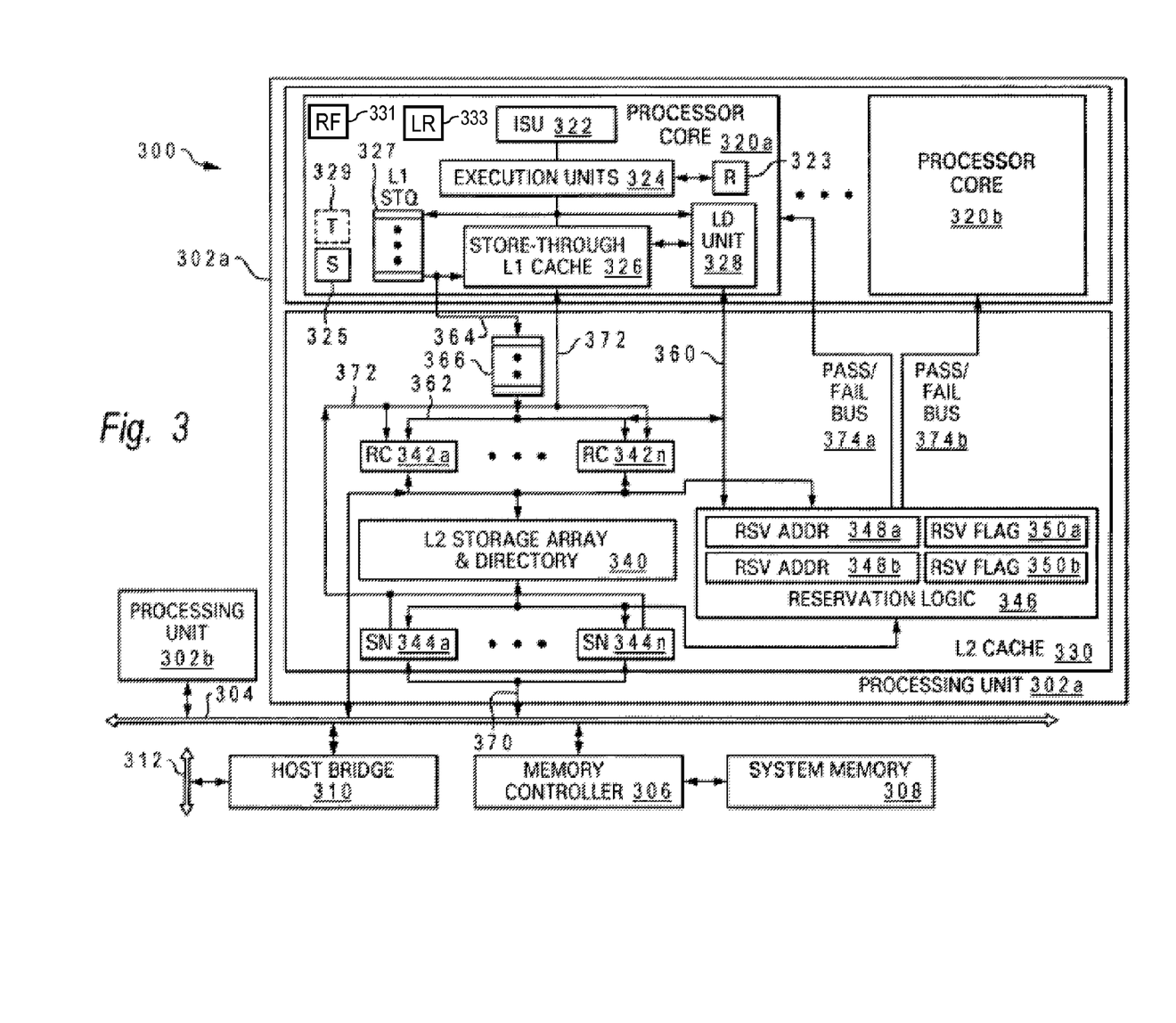
FIG. 3 is a high level block diagram of an illustrative multiprocessor data processing system in accordance with the present invention.

With reference again to the figures and in particular with reference to FIG. 3, there is illustrated a high level block diagram of an exemplary embodiment of a multiprocessor data processing system 300 in accordance with the present invention. As shown, data processing system 300, which may be, for example, a server, workstation, laptop, tablet, mobile phone or other data processing system, includes multiple processing units 302a, 302b for processing data and instructions. Processing units 302 are coupled for communication to a system interconnect 304 for conveying address, data and control information between attached devices. The attached devices include not only processing units 302, but also a memory controller 306 providing an interface to a shared system memory 308 and one or more host bridges 310, each providing an interface to a respective mezzanine bus 312. Mezzanine bus 312 in turn provides slots for the attachment of additional unillustrated devices, which may include network interface cards, I/O adapters, non-volatile memory, non-volatile storage device adapters, additional bus bridges, etc.

As further illustrated in FIG. 3, each processing unit 302, which may be realized as a single integrated circuit, includes one or more processor cores 320a, 320b for processing instructions and data in one or more simultaneous threads of execution. Each processor core 320 includes execution units 324 for executing instructions and an instruction sequencing unit (ISU) 322 for fetching and ordering instructions for execution by the execution units 324. In accordance with the present invention, the instructions executed by execution units 324 include load-reserve and store-conditional instructions, which are utilized to synchronize access to shared memory between a particular thread of execution and other concurrent threads of execution, whether executing in the same processor core 320, a different processor core 320 in the same processing unit 302, or in a different processing unit 302. In a preferred embodiment, execution units 324 execute at least load-reserve and store-conditional instructions in-order relative to each other (other instructions may or may not be executed out-of-order).

Each processor core 320 further includes an L1 store queue (STQ) 327 and a load unit 328 for managing the completion of store and load operations, respectively, corresponding to executed store and load instructions (including load-reserve and store-conditional instructions). In one embodiment, L1 STQ 327 is implemented as a First-In, First-Out (FIFO) queue containing a plurality of queue entries. Store operations are accordingly loaded in the "top" entry of L1 STQ 327 at execution of the corresponding store instruction to determine the target address, and are initiated when the store operation reaches the "bottom" or "commit" entry of L1 STQ 327. In other embodiments, L1 STQ 327 may permit out-of-order processing of store operations.

It is important to note that the present application makes a distinction between "instructions", such as load-reserve and store-conditional instructions, and "operations". Load and store "instructions" (including load-reserve and store-conditional instructions) are defined herein as inputs to an execution unit that include an operation code (opcode) identifying the type of instruction and one or more operands specifying data to be accessed and/or its address. Load and store "operations", including load-reserve and store-conditional operations, are defined herein as data and/or signals generated following instruction execution that specify the address of data to be accessed. Thus, load-reserve and store-conditional operations may be transmitted from a processor core 320 to lower level memory to initiate data accesses, while load-reserve and store-conditional instructions are not.

The operation of processor core 320 is supported by a multi-level volatile memory hierarchy having at its lowest level shared system memory 308, and at its upper levels two or more levels of cache memory, which in the illustrative embodiment include L1 cache 326 and L2 cache 330. In the particular embodiment shown in FIG. 3, L2 cache 330 is shared by multiple processor cores 320 within a processing unit 302; in other embodiments, each processor core 320 may have its own L2 cache 330. As in other shared memory MP data processing systems, the contents of the memory hierarchy may generally be accessed and modified by threads of execution executing in any processor core 320 in any processing unit 302 of data processing system 300.

In accordance with the present invention, L1 cache 326, which may include bifurcated L1 data and instruction caches, is implemented as a store-through cache, meaning that the point of cache coherency with respect to other processor cores 320 is located below L1 cache 326 and, in the depicted embodiment, is located at store-in L2 cache 330. Accordingly, as described above, L1 cache 326 does not maintain true cache coherency states (e.g., Modified, Exclusive, Shared, Invalid or a variant thereof) for its cache lines, but only maintains valid/invalid bits. Because L1 cache 326 is implemented as a store-through cache, store operations (including store-conditional operations) first complete relative to the associated processor core 120 in L1 cache 326 and then complete relative to other processing units 302 at a point of system-wide coherency, which in the depicted embodiment is L2 cache 330.

As further illustrated in FIG. 3, L2 cache 330 contains a storage array and directory 340 that stores cache lines of instructions and data in association with their respective memory addresses. L2 cache 330 also includes a number of read-claim (RC) machines 342a-342n for managing memory access operations received from the associated processor cores 320. RC machines 342a-342n receive load operations from LD unit 328 in processor core 320 via load bus 360 and command bus 362, and receive store operations from L1 STQ 327 in processor core 320 via store bus 364, an in-order L2 STQ 366, and command bus 362. L2 cache 330 further includes a number of instances of snoop (SN) machines 344a-344n for managing memory access and other operations received from other processing units 302 via system interconnect 304 and snoop bus 370. Snoop machines 344 and RC machines 342 are each connected to a core bus 372 by which any snoop machine 344 or RC machine 342 can signal the invalidation of a cache line to processor core 320 and by which RC machines 342 can acknowledge certain synchronizing operations of processor core 320, as described further below.

L2 cache 330 finally includes reservation logic 346 for recording reservations of the associated processor core(s) 320. Specifically, reservation logic 346 includes, for each thread that may be concurrently executed by the affiliated processor core(s) 320 in its processing unit 302, a respective reservation register comprising a reservation address field 348 and a reservation flag 350. For example, in the depicted example, which assumes that processor cores 320a and 320b can each execute a single thread, reservation logic 346 includes two reservation registers: reservation address field 348a and reservation flag 350a for processor core 320a and reservation address field 348b and reservation flag 350b for processor core 320b. When set (e.g., to '1'), a reservation flag 350 indicates that the associated processor core 320 holds a reservation for the address contained in reservation address field 348 and otherwise indicates no reservation is held. Reservation logic 346 supplies pass/fail indications indicating the outcomes of store-conditional operations to processor cores 320a, 320b via respective pass/fail buses 374a, 374b.

Figure 4A:
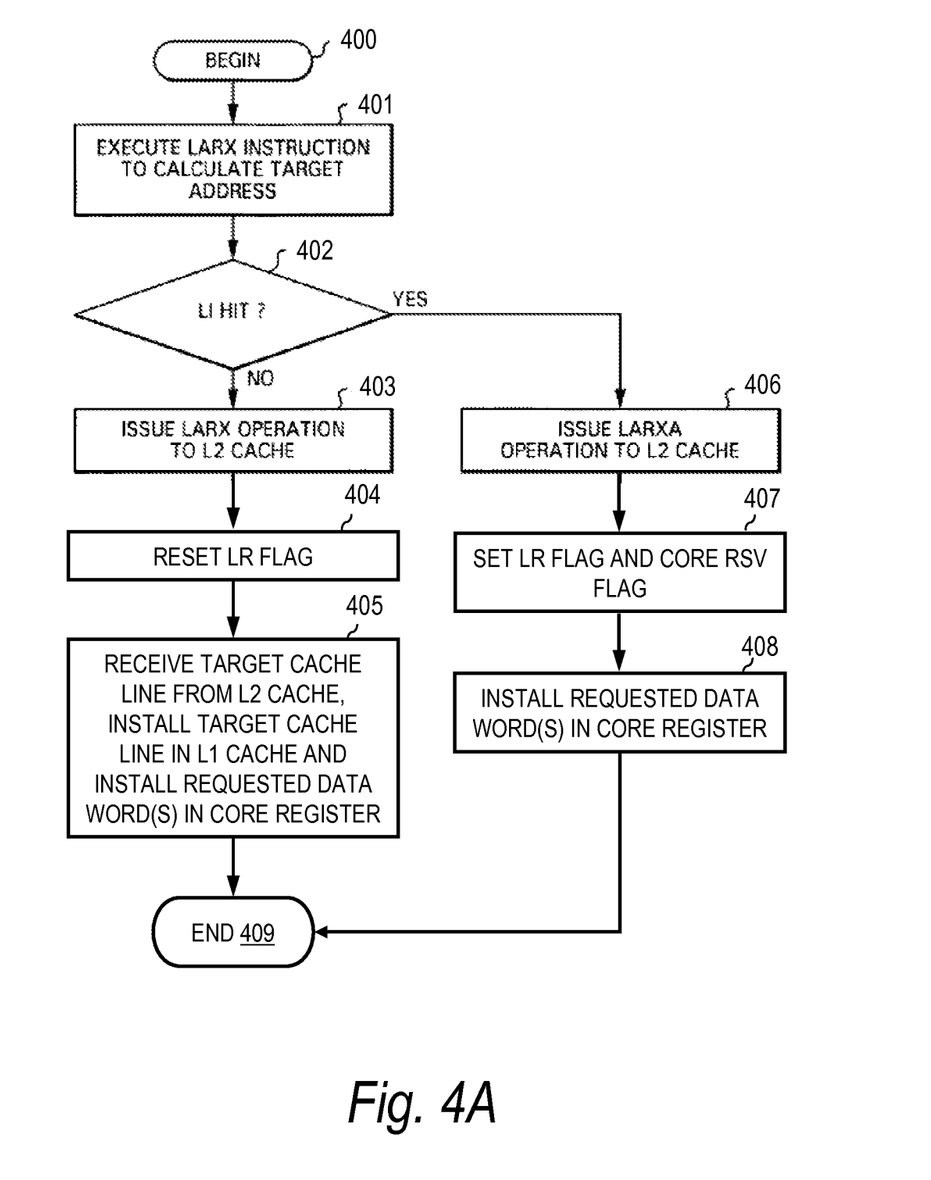
FIG. 4A is a high level logical flowchart of an exemplary method of processing a load-reserve instruction in a processor core in accordance with the present invention.

Referring now to FIG. 4A, there is depicted a high level logical flowchart of an exemplary method by which a processor core 320 of data processing system 300 processes a load-reserve instruction in accordance with the present invention. As shown, the process begins at block 400 and thereafter proceeds to block 401, which illustrates execution units 324 receiving a load-reserve instruction, referred to hereinafter as a LARX instruction, from ISU 322 and then executing the LARX instruction to calculate the load target address. In a preferred embodiment, execution units 324 execute LARX instructions within a hardware thread in-order and without pipelining, meaning that the data words(s) requested by a LARX instruction must be loaded to one or more registers 323 in processor core 320 before the next LARX instruction begins execution. These restrictions simplify the management of reservations by reservation logic 346 in L2 cache 330.

Following execution of the LARX instruction, the load target address is received from execution units 324 by LD unit 328. As illustrated at block 402, LD unit 328 then accesses the directory of L1 cache 326 to determine whether a cache line containing the data word(s) associated with the load target address reside(s) in L1 cache 326. If not, L1 cache 326 signals a cache miss to LD unit 328, which responds by issuing a LARX operation to an RC machine 342 in L2 cache 330 via load bus 360 and command bus 362, as shown at block 403. In addition, as indicated at block 404, LD unit 328 resets a load-reserve (LR) flag 333 in processor core 320 (e.g., to '0') to indicate that the most recent load-reserve operation transmitted to L2 cache 330 is a LARX operation rather than an address-only LARXA operation, as discussed further below.

Following issuance of the LARX operation and the reset of LR flag 333 to L2 cache 330, processor core 320 receives the cache line of data identified by the load target address of the LARX operation. In response to receipt of the target cache line, processor core 320 installs the entire cache line of data in L1 cache 326 and transfers the data word(s) associated with the load target address into a core register 323 (block 405). Thus, unlike some prior art processors that only load the data word(s) associated with the load target address in core register(s) and do not cache the target cache line, processor core 320 of data processing system 300 establishes the target cache line in L1 cache 326 to permit subsequent loads, and particularly subsequent load-reserve operations, to hit in L1 cache 326. Thereafter, the process terminates at block 409.

Returning to block 402, in response to LD unit 328 determining that the load target address hit in L1 cache 326, LD unit 328 issues an address-only LARXA operation to an RC machine 342 of L2 cache 330 via load bus 360 and command bus 362 to inform L2 cache 330 that the load-reserve operation has bound to a (potentially stale) value in L1 cache 326 (block 406). Thus, the LARXA operation requests no return of data. If processing unit 302 implements multiple processor cores 320 and/or processor core(s) 320 capable of executing multiple concurrent threads of execution, the LARXA operation preferably includes not only the load target address, but also the core ID and thread ID that executed the LARX instruction. In addition, as indicated at block 407, LD unit 328 sets load-reserve (LR) flag 333 in processor core 320 (e.g., to '1') to indicate that the most recent load-reserve operation transmitted to L2 cache 330 is a LARXA operation rather than a LARX operation (i.e., to indicate that the load-reserve operation bound to a potentially stale value in L1 ache 326). Block 407 also shows LD unit 328 setting a per-thread core reservation flag 331 in response to issuance of the LARXA operation. As discussed further below with respect to FIGS. 4C and 5, setting core reservation flag 331 initiates a core reservation tracking interval during which processor core 320 tracks the reservation requested by the LARXA operation for cancellation (e.g., by an invalidation message received from L2 cache 330) until such tracking responsibilities are assured to have been assumed by L2 cache 330.

As further shown at block 408, L1 cache 326 loads the data word(s) associated with the load target address into one or more core registers 323 associated with execution units 324. Following block 408, the process of FIG. 4A ends at block 409.

Figure 5:
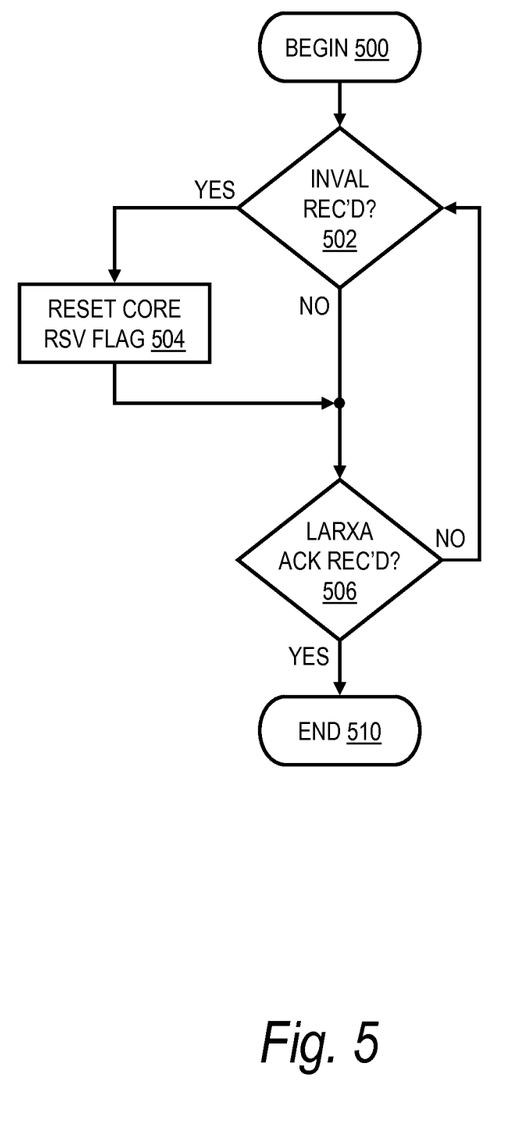
FIG. 5 is a high level logical flowchart of an exemplary method by which a processor core tracks a reservation requested by a load-reserve operation during a core reservation tracking interval.

Referring now to FIG. 5, there is depicted a high level logical flowchart of an exemplary method by which a processor core 320 monitors, on a per-thread basis, during a variable-length core reservation tracking interval for a conflicting operation that cancels a requested reservation. The illustrated process begins at block 500 upon a determination that the target address of a LARX instruction hit in L1 cache 326 at block 402 of FIG. 4A. During the core reservation tracking interval, processor core 320 continuously monitors for receipt from the associated L2 cache 330 of an invalidation message that invalidates the cache line for which the reservation is held by processor core 320 (block 502), as well as for a LARXA ACK message, which signifies that L2 cache 330 has assumed tracking of the reservation requested by the LARXA operation of processor core 320 (block 506). In response to receipt of an invalidation message from L2 cache 330 that invalidates the cache line for which is reservation is held by processor core 320, processor core 320 resets core reservation flag 331 to indicate that the reservation requested by the LARXA operation is canceled (block 504).

As indicated by the loop from block 506 back to block 502, processor core 320 continues monitoring for an invalidation message until processor core 320 determines at block 506 that a LARXA ACK message confirming allocation of an RC machine 342 to establish the reservation in L2 cache 330 has been received from L2 cache 330. In response to a determination at block 506 that a LARXA ACK message has been received, the core reservation tracking interval and the reservation tracking process shown in FIG. 5 both end (block 510). As noted above, in various operating scenarios, the duration of the core reservation tracking interval can vary.

Figure 4B:
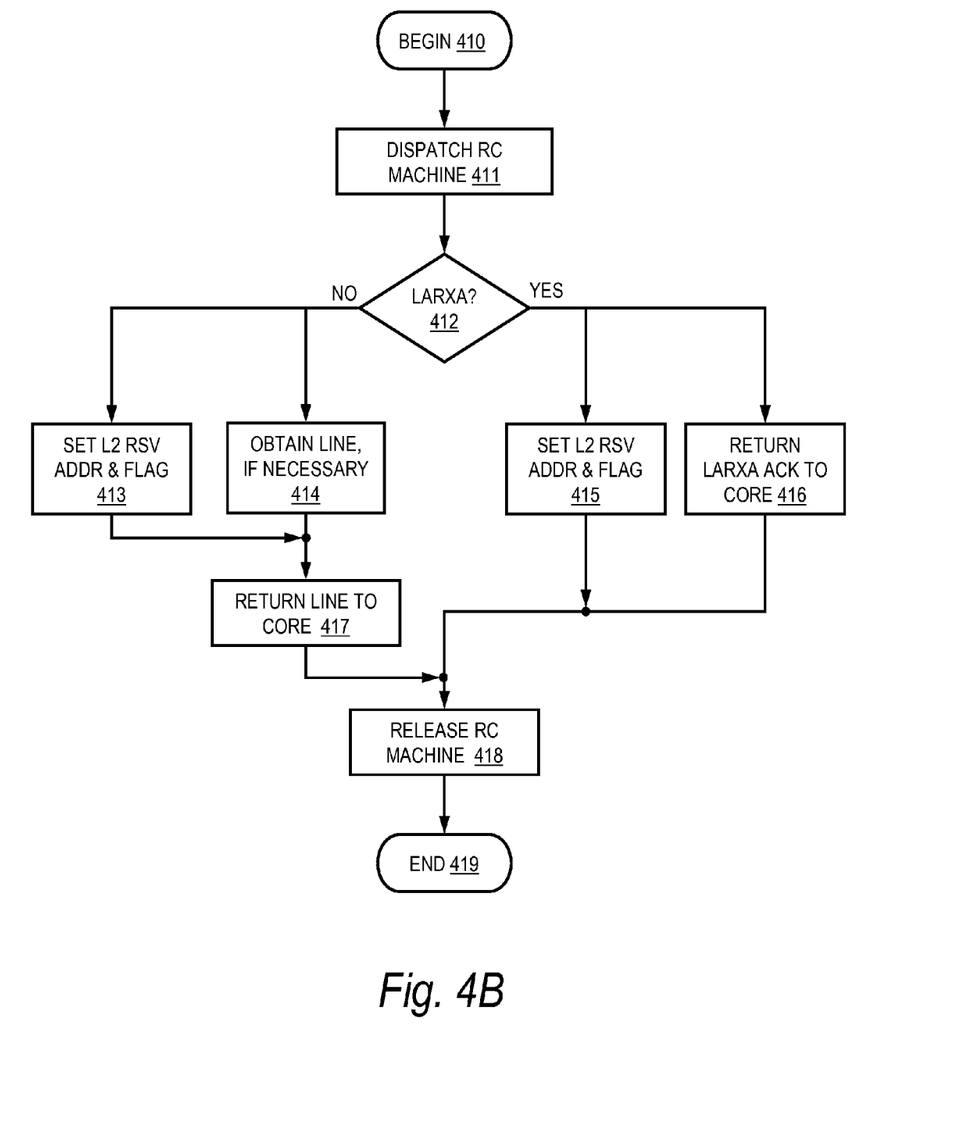
FIG. 4B is a high level logical flowchart of an exemplary method of processing a load-reserve operation in a lower level cache in accordance with the present invention.

With reference now to FIG. 4B, there is illustrated a high level logical flowchart of an exemplary method of processing load-reserve operations in a lower level cache in accordance with the present invention. The illustrated process begins at block 410 in response to an L2 cache 330 receiving a load-reserve (e.g., LARX or LARXA) operation from an affiliated processor core 320. In response to receipt of the load-reserve operation, L2 cache 330 dispatches an RC machine 342 to service the load-reserve operation (block 411). In a preferred embodiment, the RC dispatch logic of L2 cache 330 represents a point of serialization of load-reserve and store-conditional operations with respect to snooped operations in that L2 cache 330 defers dispatch of the RC machine 342 until deallocation of any snoop machine 344 then allocated to service a snooped operation targeting the same cache line as the load-reserve operation. And in a similar fashion, the presence of an RC machine 342 servicing a load-reserve or store-conditional operation defers dispatch of a snoop machine 344 to service a snooped operation targeting the same cache line as the load-reserve operation until deallocation of the RC machine 342. Once dispatched, RC machine 342 determines at block 412 whether the load-reserve operation is a LARXA operation. If not (i.e., the load-reserve operation is a LARX operation that requests return of the target cache line data), the process proceeds in parallel to blocks 413 and 414.

Block 413 illustrates the RC machine 342 allocated to service the LARX operation establishing a reservation for the load target address in L2 cache 330 by placing the load target address in a reservation address field 348 and setting the associated L2 reservation flag 350. Establishing the reservation at block 413 causes reservation logic 346 to begin monitoring for an indication that the reservation granule has been updated (and that the reservation should accordingly be canceled). Block 414 further illustrates that L2 cache 330 obtaining the target cache line of data from the L2 cache array or, if the target address misses in the L2 directory, system memory 308 or another processing unit 302. Following blocks 413-414, RC machine 342 returns the target cache line to processor core 320 (block 417). Thereafter, L2 cache 330 releases the RC machine 342 allocated to service the load-reserve operation (block 418), and the process of FIG. 4B ends at block 419.

Returning to block 412, in response to a determination by RC machine 342 that the load-reserve operation received from processor core 320 is a LARXA operation, the process proceeds in parallel to blocks 415 and 416. Block 415 illustrates the RC machine 342 establishing a reservation for the load target address of the LARXA operation in L2 cache 330, as previously described with reference to block 413. Block 416 additionally illustrates RC machine 342 returning a LARXA ACK message to processor core 320, for example, via core bus 372. In a preferred embodiment, core bus 372 serializes invalidation messages transmitted by snoop machines 344 and LARXA ACK messages transmitted by RC machines 342 in order to ensure that such messages are received by processor core 320 in the same relative order that RC machines 342 snoop machines 344 gain control of the target cache line of a reservation granule. Following blocks 415-416, the process of FIG. 4B passes to block 418-419, which have been described.

Figure 4C:
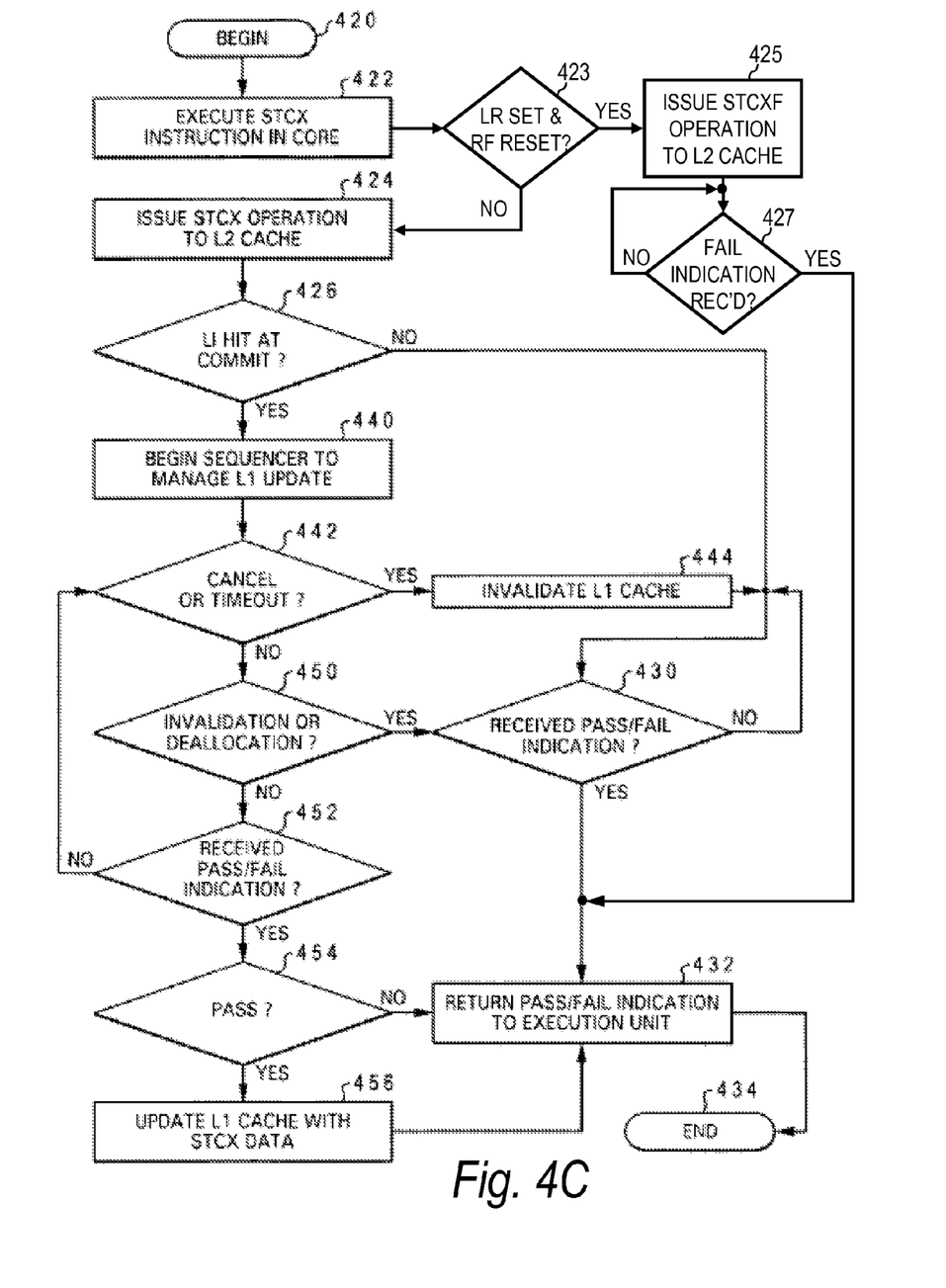
FIG. 4C is a high level logical flowchart of an exemplary method of processing a store-conditional instruction and corresponding store-conditional operation in a processor core in accordance with the present invention.

Referring now to FIG. 4C, there is depicted a high level logical flowchart of an exemplary method of processing a store-conditional instruction in a processor core 320 in accordance with the present invention. As depicted, the process begins at block 420 and thereafter proceeds to block 422, which illustrates execution units 324 receiving a store-conditional instruction, referred to hereinafter as a STCX instruction, from ISU 322 and then executing the STCX instruction to calculate the store target address. As with LARX execution described above, execution units 324 also preferably execute STCX instructions within the same hardware thread in-order and without pipelining. Upon execution of the STCX instruction, execution units 324 place a corresponding store-conditional operation including the store target address within L1 STQ 327, which may be implemented as a FIFO queue for buffering store operations that is shared by all threads executing within a processor unit 302.

At block 423, processor core 320 determines whether or not (1) the immediately previous load-reserve operation was a LARXA (e.g., as indicated by load-reserve flag 333 being set) and (2) the reservation requested by the LARXA operation has been canceled during the core reservation tracking interval (e.g., as indicated by core reservation flag 331 being reset). In response to an affirmative determination at block 423, processor core 320 issues a STCXF operation (a STCX operation with a fail flag set) to L2 STQ 366 via store bus 364 when the STCXF operation reaches the bottom (or "commit") entry of L1 STQ 327 (block 425). The STCXF operation forces L2 cache 330 to return a fail indication for the STCXF operation, thus preventing an erroneous update to store-through L1 cache 326. As indicated at block 427, processor core 320 then awaits receipt from L2 cache 330 of a fail indication via pass/fail bus 374. In response to receipt of the fail indication, processor core 320 provides the fail indication to execution units 324, as shown at block 432. Thereafter, processor core 320 deallocates the STCXF operation from L1 STQ 327, and the processing of the store-conditional instruction in processor core 320 ends at block 434 without any update of L1 cache 326 or L2 cache 330.

Returning to block 423, in response to a negative determination the process proceeds to block 424, which depicts L1 STQ 327 issuing a STCX operation to L2 STQ 366 via store bus 364 when the STCX operation reaches the bottom (or "commit") entry of L1 STQ 327. In addition, as depicted at block 426, L1 STQ 327 determines, when the STCX operation reaches the commit entry of L1 STQ 327, whether the STCX operation hit in L1 cache 326. If the store target address misses in L1 cache 326 at the commit entry of L1 STQ 327, the process passes to block 430, which depicts L1 STQ 327 awaiting a pass/fail indication indicating whether or not the STCX operation succeeded at L2 cache 330 (i.e., with respect to all other threads and cache coherent processing units 302). In response to receipt of the pass/fail operation, processor core 320 provides the pass/fail indication to execution units 324 (e.g., to indicate whether the path of execution should change), as shown at block 432, but does not write to L1 cache 326. Thereafter, the STCX operation is deallocated from L1 STQ 327, and the process terminates at block 434.

Returning to block 426, in response to L1 STQ 327 determining that the store target address of the STCX operation hit in L1 cache 326 at the commit entry of L1 STQ 327, the process proceeds to block 440. Block 440 illustrates L1 STQ 327 initiating sequencer logic 325 to manage the conditional update to L1 cache 326. That is, because the success of the STCX operation is conditioned on the absence of other store operations to the same reservation granule following the point in time that the associated LARX operation binds to a value, the store data of the STCX operation cannot be placed in L1 cache 326 until L2 cache 330 has processed the STCX operation and ensured that it has completed successfully system-wide.

As noted above, L1 STQ 327 may be implemented as a FIFO queue, meaning that until the STCX operation in the bottom or "commit" entry of L1 STQ 327 has finished and written to L1 cache 326 (if necessary), L1 STQ 327 is blocked and other store operations cannot make forward progress. In order to avoid a potential deadlock and/or performance degradation, sequencer logic 325 of L1 STQ 327 preferably implements at least one mechanism by which sequencer logic 325 can discontinue waiting for the pass/fail indication from L2 cache 330 in order to update L1 cache 326 and can instead invalidate the target cache line in L1 cache 326.

In a preferred embodiment, sequencer logic 325 of L1 STQ 327 implements two "escape" mechanisms to cause sequencer logic 325 to stop waiting for the pass/fail indication from L2 cache 330 in order to update L1 cache 326. The first of these mechanism is a respective cancel (or latency) signal from L2 cache 330 for each processor core 320 and thread that, when asserted, indicates that L2 cache 330 is likely to delay returning the pass/fail indication (e.g., because of an L2 cache miss, the target cache line is held in Shared state, etc.). As shown at blocks 442 and 444, when sequencer logic 325 of L1 STQ 327 receives the cancel (latency) signal, sequencer logic 325 of L1 STQ 327 invalidates the target cache line in L1 cache 326 if the target cache line is still valid.

The other mechanism by which sequencer logic 325 can abandon the update to L1 cache 326 is an optional timeout counter (T) 329. If implemented, L1 STQ 327 starts timeout counter 329 in response to issuance of a STCX operation to L2 cache 330, and in response to a predetermined, programmable number of cycles elapsing prior to receipt of a pass/fail indication from L2 cache 330 (as indicated by a latency signal generated by timeout counter 329), sequencer logic 325 similarly invalidates the target cache line in L1 cache 326, as shown at block 442 and 444. By abandoning the writeback of the store data to L1 cache 326 in this manner, L1 STQ 327 can continue to make forward progress on other store operations. The process thereafter proceeds from block 444 to block 430, which has been described.

Still referring to FIG. 4C, following a determination at block 442 that no cancel signal has been received from L2 cache 330 and no timeout has occurred, the process passes to block 450. Block 450 illustrates L1 STQ 327 determining whether L1 cache 326 has deallocated the target cache line of the STCX operation or has invalidated the target cache line of the STCX operation, for example, in response to receipt of a back-invalidate signal on core bus 372. If so, the process passes to block 430, which has been described. If not, L1 STQ 327 determines at block 452 whether a pass/fail indication has been received from L2 cache 330 via pass/fail bus 374. If not, the process returns to block 442, representing sequencer logic 325 of L1 STQ 327 waiting until a pass/fail signal or cancel signal is received or a timeout, invalidation or deallocation occurs. In response to a determination at block 452 that a pass/fail indication has been received, sequencer logic 325 of L1 STQ 327 takes the appropriate action, as shown at block 454. Namely, if the pass/fail indication is a fail indication, the process passes to block 432, which has been described. If, on the other hand, the pass/fail indication is a pass indication, sequencer logic 325 of L1 STQ 327 updates L1 cache 326 with the store data from the STCX operation, as depicted at block 456. Thereafter, the process passes to block 432, which has been described.

Figure 4D:
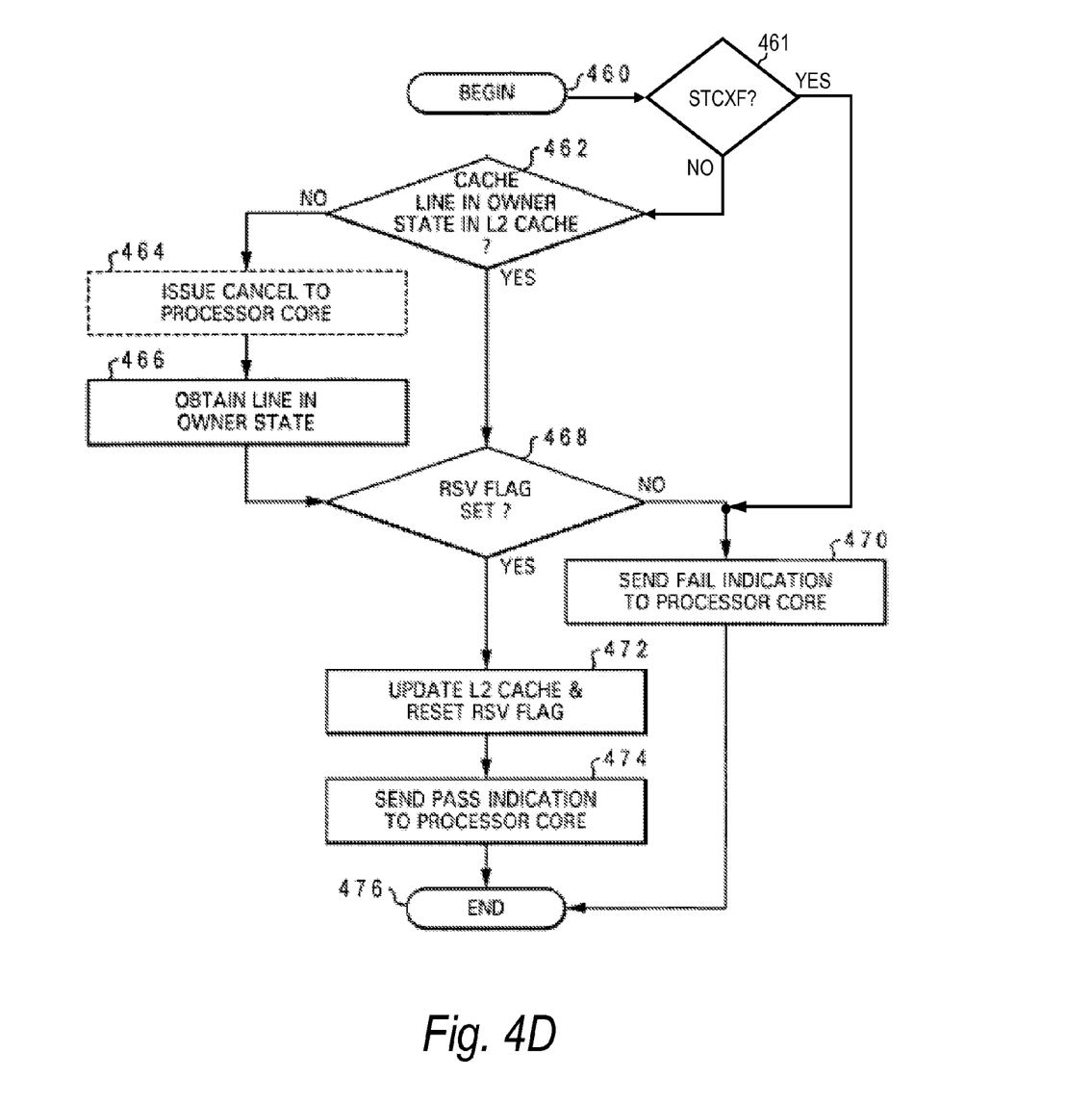
FIG. 4D is a high level logical flowchart of an exemplary method of processing a store-conditional operation in lower level cache in accordance with the present invention.

Referring now to FIG. 4D, there is depicted a high level logical flowchart of an exemplary method of processing a store-conditional operation in a lower level cache in accordance with the present invention. The process shown in FIG. 4D begins at block 460 when a store-conditional (e.g., STCX or STCXF) operation is received by L2 cache 330 within L2 STQ 366 via store bus 364. L2 STQ 366, like L1 STQ 327, may be implemented as a FIFO queue. Store operations, including STCX and STCXF operations, pass from the bottom entry of L2 STQ 366 to RC machines 342 for processing.

At block 461, an RC machine 342 allocated to service the store-conditional operation determines if the store-conditional operation is a STCXF operation. If so, the RC machine 342 transmits a fail indication to processor core 320 via pass/fail bus 374, as shown at block 470. Thereafter, L2 cache 330 deallocates the RC machine 342 allocated to the STCXF operation, and the process terminates at block 476.

Returning to block 461, in response to a determination that the store-conditional operation is a STCX operation, the RC machine 342 allocated to service the STCX operation determines by reference to the L2 directory within storage array and directory 340 whether or not L2 cache 330 holds the target cache line in an "owner" cache state (block 462), such as Modified or Exclusive, in which the target cache line can be updated without first obtaining modification ("owner") rights from another processing unit 302. If not, the RC machine 342 optionally issues a cancel signal to the processor core 320, as shown at block 464, to indicate that L1 STQ 327 should abandon the STCX update to L1 cache 326. In addition, RC machine 342 obtains the target cache line in an "owner" state, for example, by issuing a read-with-intent-to-modify transaction on system interconnect 304, as shown at block 466. The process shown in FIG. 4C then proceeds to block 468.

Block 468 illustrates the RC machine 342 determining whether or not a L2 reservation flag 350 for the store target address is set (i.e., whether or not any other processing core 320 or thread has modified the reservation granule). If not, reservation logic 346 transmits a fail indication to processor core 320 via pass/fail bus 374, as shown at block 470. Thereafter, the process terminates at block 476. If, on the other hand, a determination is made at block 468 that reservation flag 350 is still set, indicating that no other processor core 320 or thread has modified the reservation granule, RC machine 342 updates the L2 cache array within storage array and directory 340 with the store data of the STCX operation and resets L2 reservation flag 350, as shown at block 472. Reservation logic 346 also sends a pass indication to processor core 320 at block 474. Thereafter, the process ends at block 476.

Figure 4E:
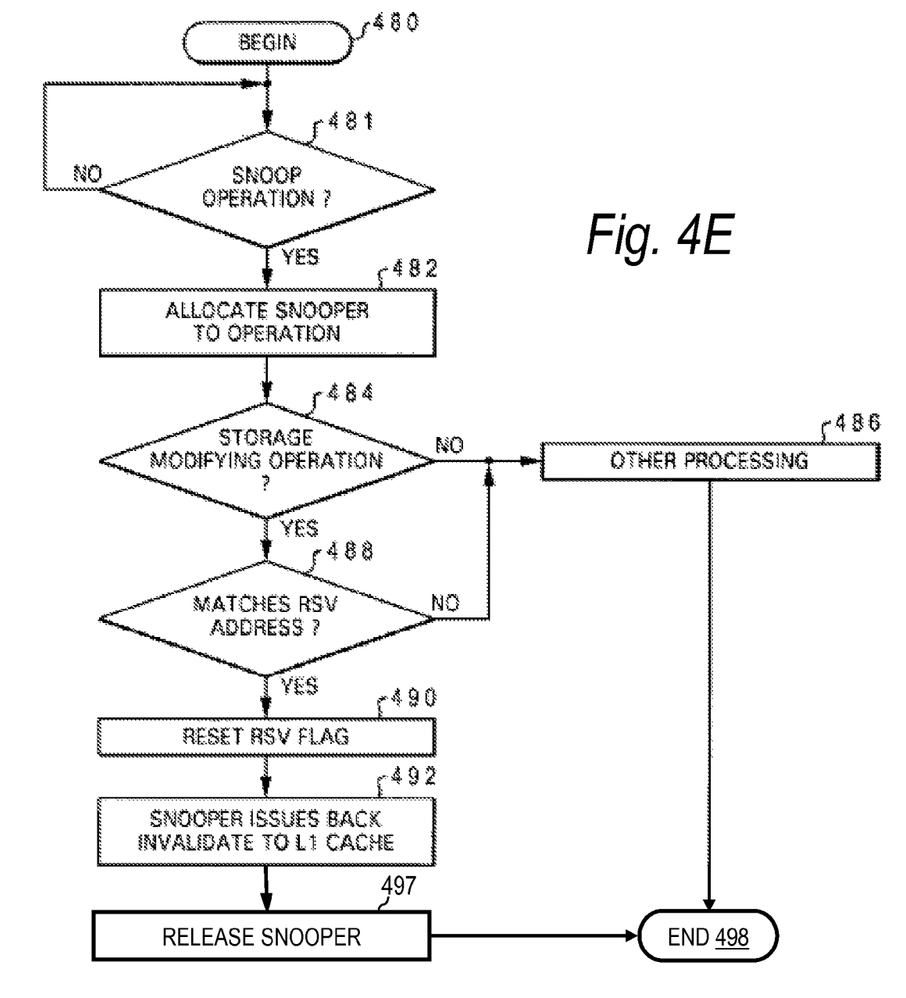
FIG. 4E is a high level logical flowchart of an exemplary method of processing operations snooped on a system bus in accordance with the present invention.

With reference now to FIG. 4E, there is illustrated a flowchart of an exemplary method of processing operations snooped on a system bus in accordance with the present invention. As depicted, the process begins at block 480 and thereafter proceeds to block 481, which illustrates the process iterating until L2 cache 330 snoops an operation on system interconnect 304. When L2 cache 330 snoops an operation on system interconnect 304, L2 cache 330 allocates a snoop machine 344 to handle the operation at block 482 (block 482). The snoop machine 344 determines at block 484 whether or not the snooped operation is a storage-modifying operation. If not, the process passes to block 486 for other processing (e.g., an L2 directory update) and thereafter terminates at block 498.

If, however, the snoop machine 344 determines at block 484 that the snooped operation is a storage-modifying operation, snoop machine 344 makes a further determination whether the target address of the storage-modifying operation matches the contents of a reservation address field 348 (block 488). If not, the process passes to block 486, which has been described. If, however, the target address of the snooped storage-modifying operation matches an address contained in a reservation address field 348, snoop machine 344 resets the associated L2 reservation flag 350 to cause any subsequent STCX operation to the address specified in reservation address field 348 to fail, as shown at block 490. In addition, the snoop machine 344 issues a back-invalidate signal specifying the target address of the snooped storage-modifying operation to processor core 320 (e.g., L1 cache 326) via core bus 372, as shown at block 492. The back-invalidate signal clears the associated cache line from L1 cache 326, thus preventing subsequent LARX operations from hitting in the cache line. It should be noted that while the back-invalidation is underway, RC machines 342 and snoop machines 344 prevent any STCX or LARX (not LARXA) operations from proceeding until L2 reservation flag 350 is reset and the cache line is invalidated in L1 cache 326. Snoop machine 342 is then released at block 497, and the process thereafter terminates at block 498.

It should be noted that in embodiments of the present invention in which multiple processor cores 320 share an L2 cache 330, as shown in FIG. 3, reservations established by LARX and LARXA operations by processor core 320a can be canceled (i.e., reset) not only by storage-modifying operations snooped by L2 cache 330 on system interconnect 304, but also by storage-modifying operations by another processor core 320b sharing L2 cache 330. In such embodiments, the RC machine 342 receiving the storage-modifying operation from processor core 320b performs the steps depicted in FIG. 4E in the same manner described above, as well as the storage update specified by the storage-modifying operation.

As has been described, in some embodiments in response to execution of a load-reserve instruction that binds to a load target address held in a store-through upper level cache, a processor core sets a core reservation flag, transmits a load-reserve operation to a store-in lower level cache, and tracks, during a core reservation tracking interval, the reservation requested by the load-reserve operation until the store-in lower level cache signals that the store-in lower level cache has assumed responsibility for tracking the reservation. In response to receipt during the core reservation tracking interval of an invalidation signal indicating presence of a conflicting snooped operation, the processor core cancels the reservation by resetting the core reservation flag and fails a subsequent store-conditional operation. Responsive to not canceling the reservation during the core reservation tracking interval, the processor core determines whether a store-conditional operation succeeds by reference to a pass/fail indication provided by the store-in lower level cache.

While the present invention has been particularly shown as described with reference to one or more preferred embodiments, it will be understood by those skilled in the art that various changes in form and detail may be made therein without departing from the spirit and scope of the invention.

What is claimed is:

1. A processing unit for a multiprocessor data processing system, said processing unit comprising:
   a processor core including a store-through upper level cache, an instruction execution unit, a core reservation flag, and a load-reserve flag;
   wherein the processor core is configured to:
      responsive to the instruction execution unit executing a load-reserve instruction that binds to a load target address held in the store-through upper level cache:
      set the core reservation flag to initiate a core reservation tracking interval;
      transmit a load-reserve operation to a store-in lower level cache that records a reservation in the store-in lower level cache for the load target address and set the load-reserve flag to indicate the load-reserve operation bound to a value in the upper level cache;
      track, during the core reservation tracking interval, the reservation requested by the load-reserve operation, wherein the core reservation tracking interval terminates in response to receipt from the store-in lower level cache of a message indicating that the store-in lower level cache has assumed responsibility for tracking the reservation;
      responsive to receipt during the core reservation tracking interval of an invalidation signal indicating presence of a conflicting snooped operation, reset the core reservation flag;
      responsive to the core reservation flag being reset during the core reservation tracking interval and the load-reserve flag being set to indicate that the load-reserve operation bound to a value in the upper level cache, fail a subsequent store-conditional operation by issuing the subsequent store-conditional operation to the store-in lower level cache with a fail flag; and
      responsive to the core reservation flag not being reset during the core reservation tracking interval, determine whether a subsequent store-conditional operation succeeds by reference to a pass/fail indication provided by the store-in lower level cache.

2. The processing unit of claim 1, wherein the core reservation tracking interval is a variable length interval.

3. The processing unit of claim 1, wherein the processor core is configured to:
   responsive to the load-reserve operation not binding in the store-through upper level cache, refrain from setting the core reservation and load-reserve flags and from tracking the reservation.

4. The processing unit of claim 1, and further comprising the store-in lower level cache.

5. The processing unit of claim 3, wherein said lower level cache includes:
   a reservation register that, responsive to the load-reserve operation, stores the load target address of the load-reserve operation and sets an associated reservation flag; and
   a machine that resets the reservation flag in response to receipt of a conflicting operation;
   wherein the lower level cache transmits the pass/fail indication based on a state of the reservation flag.

6. The processing unit of claim 1, wherein the processor core serializes load-reserve operations and store-conditional operations.

7. A data processing system, comprising:
   a system interconnect;
   a system memory coupled to the system interconnect; and
   a plurality of processing units coupled to the system interconnect, the plurality of processing units including at least one processing unit in accordance with claim 1.

* * * * *